United States Patent [19]

Tanaka et al.

[11] Patent Number: 4,934,471
[45] Date of Patent: Jun. 19, 1990

[54] DEVICE FOR CONNECTING WORKING IMPLEMENT TO TRACTOR

[75] Inventors: Yoshio Tanaka; Takashi Sugawara, both of Osaka, Japan

[73] Assignee: Kubota Ltd., Osaka, Japan

[21] Appl. No.: 131,741

[22] Filed: Dec. 11, 1987

[30] Foreign Application Priority Data

Dec. 13, 1986 [JP] Japan .................. 61-297378

[51] Int. Cl.⁵ .................................. B60D 1/00
[52] U.S. Cl. .................. 180/14.4; 180/53.3; 180/900; 172/47; 172/275
[58] Field of Search .......... 180/14.4, 900, 53.3; 280/461 A, 460 A, 415 R, 415.1, 417.1; 172/275, 272, 274, 47

[56] References Cited

U.S. PATENT DOCUMENTS

| | | | |
|---|---|---|---|
| 3,512,804 | 5/1970 | Siegert | 280/460 R |
| 3,807,769 | 4/1974 | Thompson et al. | 280/461 R X |
| 4,090,725 | 5/1978 | Perin | 280/479 A |
| 4,176,727 | 12/1979 | Perin | 180/53.3 |
| 4,203,238 | 5/1980 | Bangert et al. | 172/272 X |
| 4,512,413 | 4/1985 | Hirata et al. | 172/47 X |

FOREIGN PATENT DOCUMENTS 58-216605 12/1983 Japan .
60-259104 12/1985 Japan .

OTHER PUBLICATIONS

Japanese Utility Model Publication SHO 61-11, published 9/1/80.

Primary Examiner—Charles A. Marmor
Assistant Examiner—Tamara L. Finlay

[57] ABSTRACT

A tractor has a three-point link assembly comprising a top link and opposed lower links which are connected together by a connecting assembly at their ends toward a working implement. The connecting assembly comprises an upper connector and lower connectors removably in engagement with corresponding connectable portions of the implement. The PTO shaft of the tractor is connected to an input shaft of the implement by an extendable transmission shaft having a pair of tractor joint and implement joint at its opposite ends. The connecting assembly has a clutch for separably operatively connecting an externally splined portion of the implement input shaft to an internally splined portion of the implement joint. The clutch comprises a guide fixed to the connecting assembly and extending substantially longitudinally of the tractor, a tubular case provided in the guide movably axially thereof and an operating assembly for the case. The implement joint is inserted in the case.

17 Claims, 14 Drawing Sheets

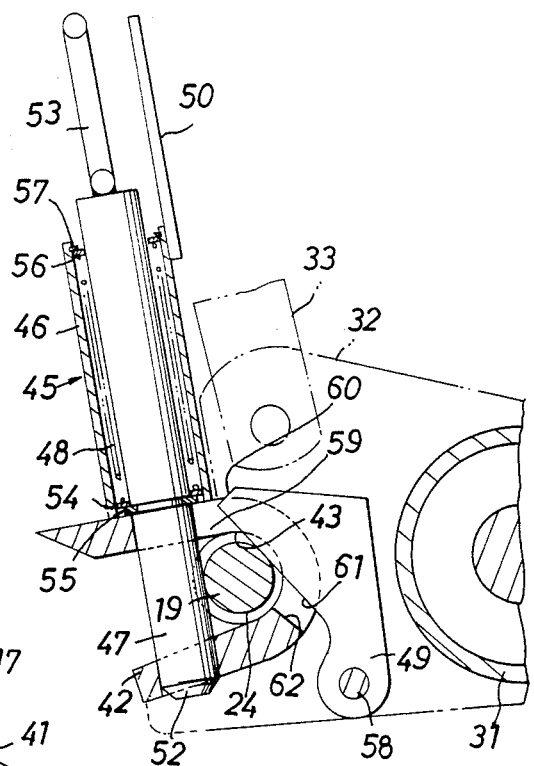
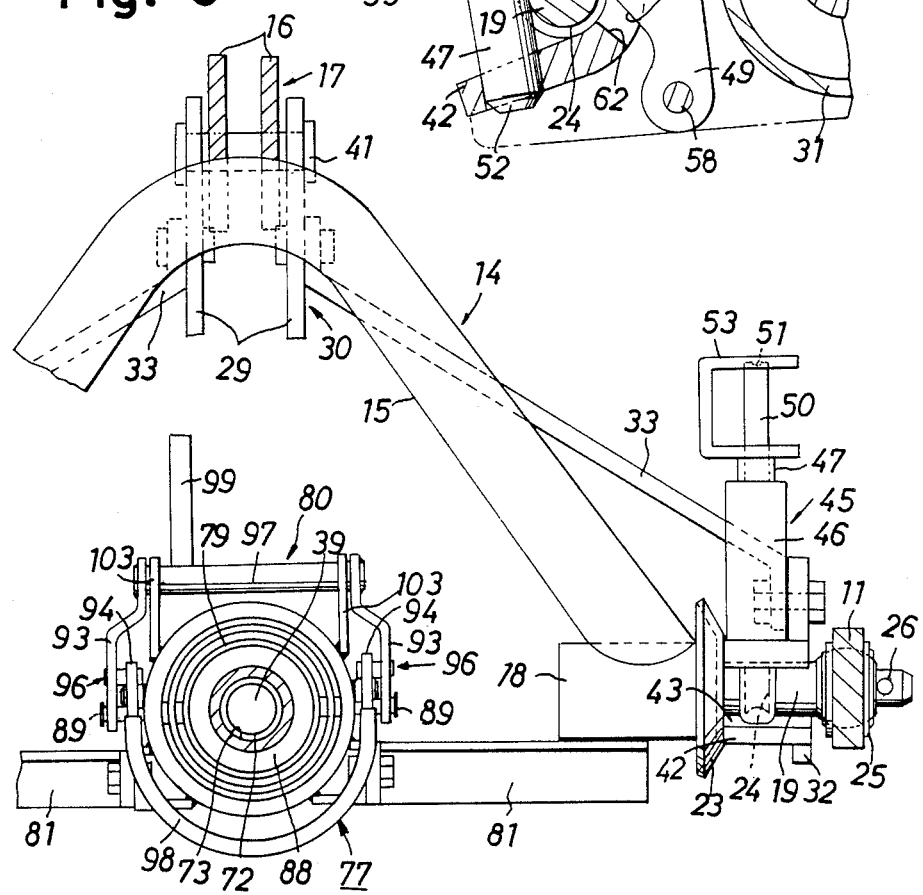

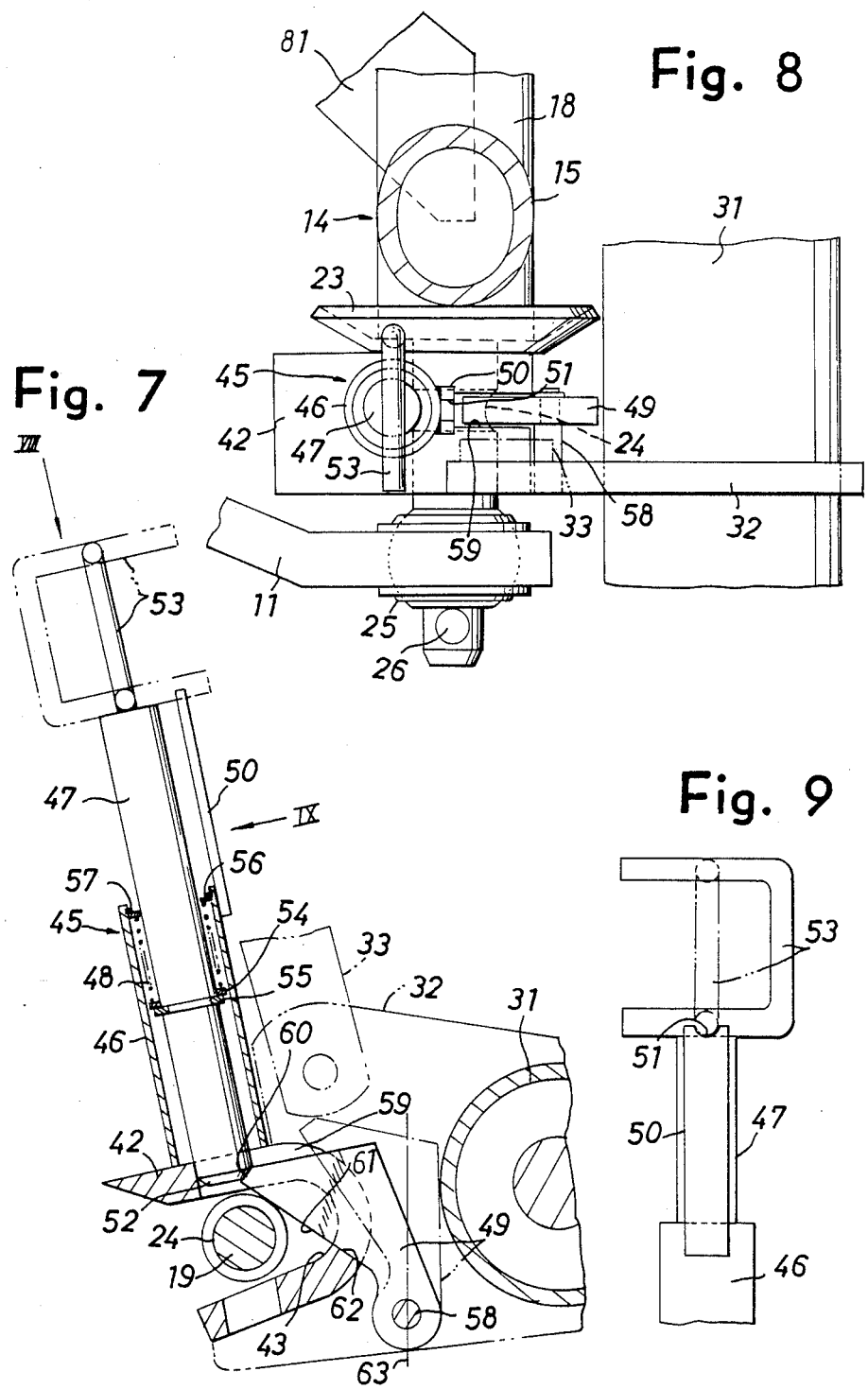

DEVICE FOR CONNECTING WORKING IMPLEMENT TO TRACTOR

FIELD OF THE INVENTION AND RELATED ART STATEMENT

The present invention relates to a device for connecting a working implement to a tractor, and more particularly to a device for liftably separably connecting a working implement to a tractor by a three-point link assembly and separably operatively connecting an input shaft of the implement to the PTO shaft of the tractor.

It is well known to separably connect a rotary tiller to a tractor by a three-point link assembly comprising a central top link and a pair of side lower links and to lift or lower the tiller by a hydraulic unit provided on the tractor for this purpose.

The above arrangement includes an extendable transmission shaft interposed between the tractor PTO shaft and the tiller input shaft and extending substantially longitudinally of the tractor. The shaft has at its opposite ends a pair of front joints positioned close to the tractor and a rear joint close to the tiller. The front joint comprises an internally splined portion having an externally splined portion of the tractor PTO shaft joined thereto removably operatively. The rear joint comprises an internally splined portion having an externally splined portion of the tiller input shaft joined thereto removably operatively.

Unexamined Japanese Patent Publication No. SHO 60-259104 discloses a connecting assembly for readily connecting a tiller to the three-point link assembly of a tractor.

The connecting assembly connects the top link to the lower links at their ends toward the tiller. The connecting assembly comprises an upper connector positioned above its widthwise midportion and a pair of lower connectors positioned at its opposite sides.

The tiller is connected to the tractor by raising the assembly by a working implement lifting hydraulic unit on the tractor to engage the upper connector with a corresponding upper connectable portion of the tiller, and further raising the assembly to permit the tiller as supported by the upper connector to move toward the tractor under gravity, whereby the lower connectors are engaged with and held by corresponding lower connectable portions of the tiller.

To connect the tiller to the tractor, the tiller can therefore be easily attached to the connecting assembly by positioning the assembly in position in front of the tiller and then raising the assembly, and is also easily removable from the assembly. Consequently, the tiller is connectable to and removable from the threepoint link assembly of the tractor easily and quickly.

Nevertheless, no consideration is given to the foregoing devices to render the tiller input shaft easily connectable to and disconnectable from the tractor PTO shaft. It is desired to propose a device for making these two shafts readily connectable to and disconnectable from each other.

OBJECTS AND SUMMARY OF THE INVENTION

A first object of the present invention is to render a working implement readily connectable to and disconnectable from the three-point link assembly of a tractor and also to make the input shaft of the working implement readily attachable to and removable from an implement joint operatively connected to the PTO shaft of the tractor so that the implement can be readily connected to and disconnected from the tractor.

A second object of the invention is to eliminate the likelihood that even when a great reaction acts on the working implement, the working implement input shaft as operatively connected to the tractor PTO shaft will not inadvertently separate from the PTO shaft.

A third object of the invention is to provide a compact clutch assembly for removably operatively connecting the working implement input shaft to the implement joint operatively connected to the tractor PTO shaft to obviate to the greatest possible extent the likelihood that the distance between the tractor and the working implement will become longer than is the case with the conventional devices.

To fulfill the above objects, the present invention provides the following means.

A tractor has a liftable three-point link assembly comprising a central top link and a pair of opposed side lower links, the top link being connected to the lower links by a connecting assembly at their ends toward a working implement. The tractor is provided with a lifting unit for raising and lowering the three-point link assembly and the connecting assembly.

The connecting assembly comprises an upper connector positioned above its widthwise midportion and a pair of lower connectors positioned at its opposite sides, the upper and lower connectors being removably held by corresponding connectable portions of the working implement respectively in engagement therewith.

A transmission shaft is interposed between a PTO shaft of the tractor and an input shaft of the working implement, is extendable and extends substantially longitudinally of the tractor. The transmission shaft has at its opposite ends a pair of tractor joint and implement joint. The tractor PTO shaft has an externally splined portion removably operatively fitted in an internally splined portion of the tractor joint, while the implement input shaft has an externally splined portion removably operatively fitted in an internally splined portion of the implement joint.

The connecting assembly is provided with a clutch for separably operatively connecting the implement joint to the implement input shaft. The clutch comprises a guide positioned substantially longitudinally of the tractor and fixed to the connecting assembly, a tubular case having an axis extending substantially longitudinally of the tractor and supported by the guide movably in the axial direction, and an operating assembly for the tubular case.

The tubular case has the implement joint inserted therein. This case is movable axially thereof and thereby shiftable between a connecting position where the implement joint is operatively connected to the implement input shaft and a separating position where the implement joint is separate from the input shaft.

The operating assembly shifts the tubular case from the separating position to the connecting position after the upper and lower connectors of the connecting assembly are respectively held by the upper and lower connectable portions of the working implement in engagement therewith. The operating assembly comprises a shifter for shifting the tubular case to each of the above positions by moving the case axially thereof, a holder for holding the tubular case in each of the above positions releasably, and means for coupling the shifter to the holder to release the case from the holder when the case is to be moved by the shifter.

BRIEF DESCRIPTION OF THE DRAWINGS

FIGS. 1 to 15 show a first embodiment of the invention;

FIGS. 1 and 2 are fragmentary side elevations partly in section showing the embodiment in different operative positions;

FIG. 3 is a fragmentary front view partly in section and showing the same;

FIG. 4 is an overall side elevation;

FIG. 5 is a view in section taken along the line V—V in FIG. 1;

FIGS. 6 and 7 are views in vertical section showing a lower connectable portion, and a restraining assembly in different operative positions;

FIGS. 8 and 9 show the portions indicated by the arrows VIII and IX in FIG. 7, respectively, each as it is seen in the direction of the arrow;

FIGS. 10 to 12 are side elevations chiefly showing a clutch in different operative positions;

FIG. 13 is a front view partly in section and showing the same;

FIGS. 14 and 15 are sectional views in development chiefly showing the clutch in different operative positions;

FIGS. 16 to 18 are views in vertical section showing a lower connectable portion, and a restraining assembly in different operative positions;

FIG. 19 is a plan view of the same;

FIG. 20 is a side elevation of a clutch, etc.;

FIG. 21 is a fragmentary front view of the same;

DESCRIPTION OF THE PREFERRED EMBODIMENTS

Figure 4:
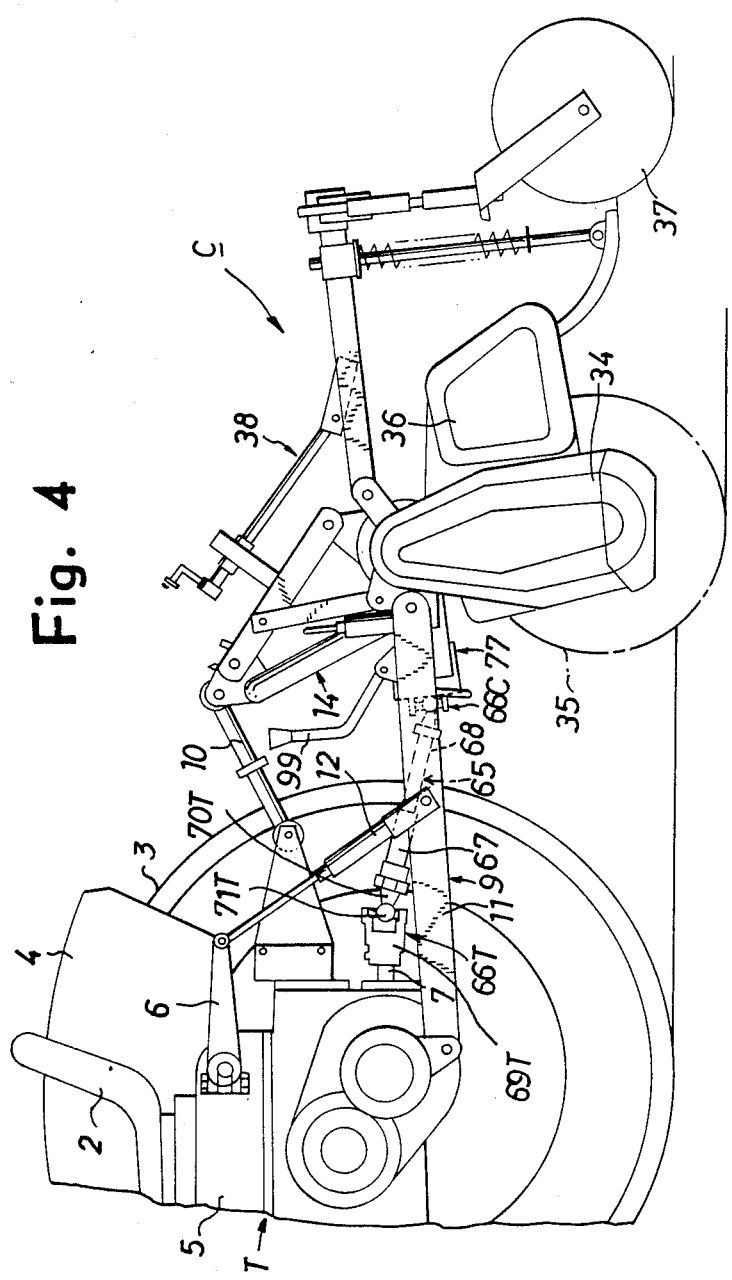

An embodiment of the invention will be described below with reference to FIGS. 1 to 15. FIG. 4 shows a tractor T which has a body 1, seat 2, a pair of opposite front wheels (not shown), rear wheels 3, rear wheel fenders 4, etc.

Mounted on the rear portion of the body 1 is a lifting unit, e.g., a working implement lifting unit 5 having a pair of opposite lift arms 6. A PTO shaft 7 extends rearward from the rear end of the body 1.

A side drive rotary tiller C as an example of working implement is disposed in the rear of the tractor T and removably liftably connected to the tractor by a three-point link assembly 9.

The three-point link assembly 9 comprises a central top link 10 and a pair of opposite side lower links 11. The lower link 11 is connected to the lift arm 6 by a lift rod 12 at each side of the body 1.

Figure 1:
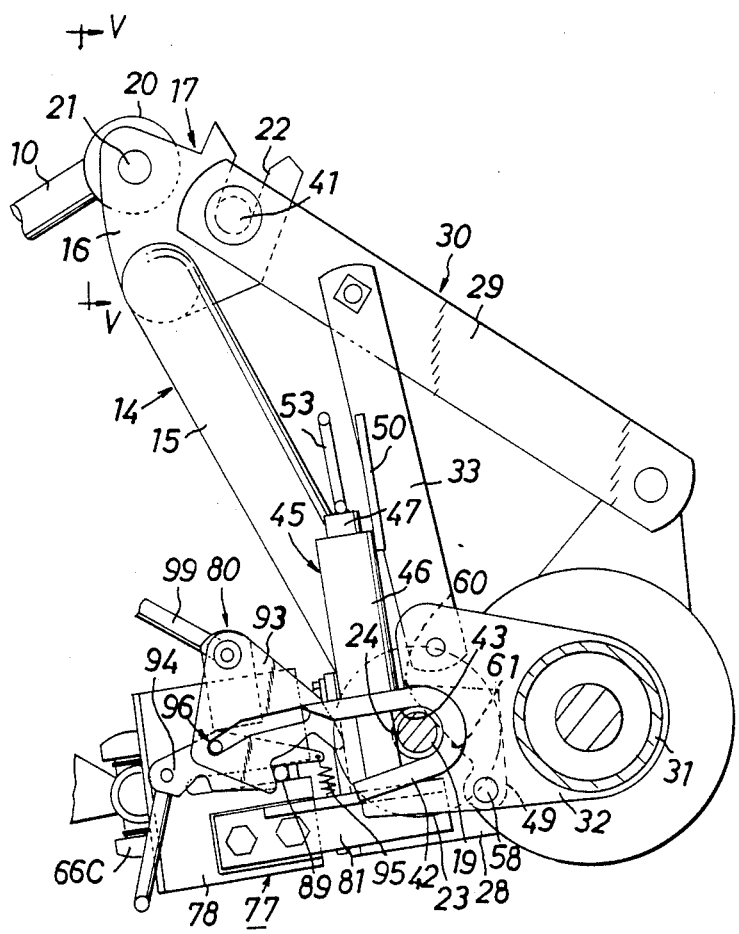
Figure 2:
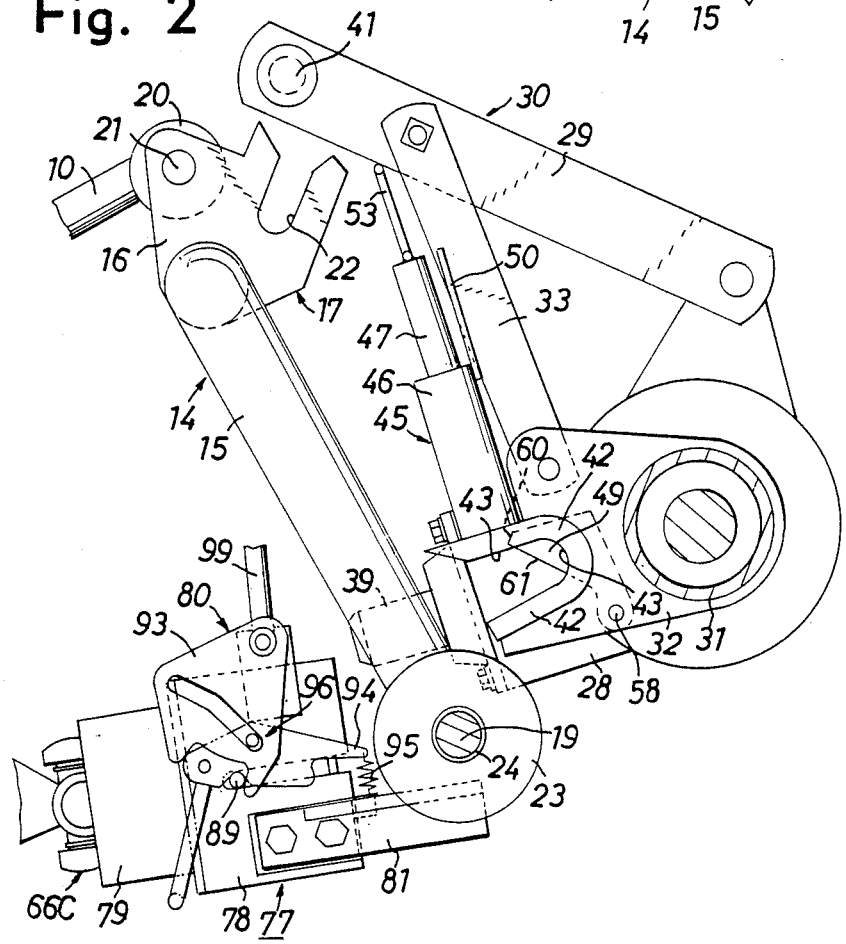

With reference to FIGS. 1 to 3, the top link 10 is connected to the lower links 11 by a connecting assembly 14 at their ends toward the tiller C, i.e., at their rear ends. The connecting assembly 14 comprises an upwardly projecting tubular main body 15 generally inverted U-shaped when seen from front, an upper connector 17 comprising a pair of opposed side plates 16 and projecting from the upper end of the widthwise midportion of the main body 15 obliquely rearwardly upward, a pair of tubular members 18 attached to the respective side ends of the main body 15 and extending sidewise, a pair of lower connectors 19 projecting outward sidewise from the outer ends of the respective tubular members 18 and having a smaller diameter than the tubular members 18, etc.

Figure 5:
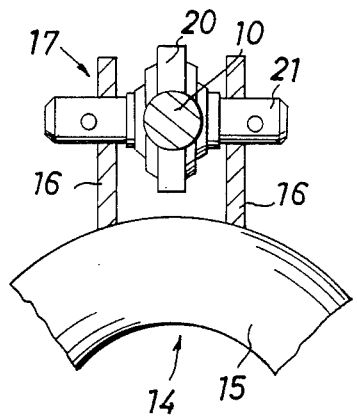

As shown also in FIG. 5, a ball joint member 20 at the rear end of the top link 10 is removably attached to and provided between the side plates 16 of the upper connector 17 at its front portion by a pin 21. The rear portion of each side plate 16 has a cutout 22 extending obliquely upwardly rearward. The cutout 22 has at its upper portion a width gradually increasing toward its upper end.

A hollow frustum of a conical-shaped side guide member 23 is fitted fixedly around the outer end of the tubular member 18, with the smaller end face positioned outside Each lower connector 19 is in the form of a round bar having a lateral axis and has a circumferential groove 24 formed in an inward portion thereof. A ball joint member 25 of the lower link 11 is removably fitted around an outer portion of the connector 19 and retained in place by a pin 26.

The tiller C, serving as an example of a working implement, is removably attached to the connecting assembly 14 and comprises an input case 28 positioned in the center of its front upper portion, a top mast 30 composed of a pair of opposed side plates 29 and projecting obliquely forwardly upward from the input case 28, a pair of support arms 31 projecting from the case 28 sidewise, a pair of brackets 32 each projecting forward from an intermediate portion of the support arm 31, a pair of support links 33 connecting upper end portions of the side plates 29 of the top masts 30 to the front ends of the respective brackets 32, a transmission case 34 and a side plate extending downward from the outer ends of the support arms 31, 31, respectively, a tilling assembly 35 including a drivingly rotatable tiller shaft laterally extending between and supported by the transmission case 34 and the side plate and having a multiplicity of tines on the tiller shaft, a cover 36 covering the tilling assembly 35, a pair of opposed gauge wheels 37, cultivation depth adjusting means 38 for upwardly or downwardly moving the gauge wheels 37, etc.

The input case 28 has a forwardly projecting input shaft 39 rotatably supported by a bearing 40.

As shown also in FIG. 3, an upper connectable portion 41, for example in the form of a round bar having a lateral axis, is provided across the upper ends of the opposed side plates 29 of the top mast 30. The cutout portion 22 of the upper connector 17 is removably engaged with or fitted to the upper connectable portion 41 from below.

As shown also in FIGS. 6 and 8, a pair of opposite lower connectable portions 42 are generally U-shaped when seen from one side and secured to the respective brackets 32 in a forwardly projecting manner. Each lower connectable portion 42 is inclined forwardly downward and has an upper wall projecting forward beyond a lower wall thereof. The lower surface of the front portion of the upper wall is slanted forwardly upward. The lower connectable portion 42 is formed inside thereof with an engaging cavity 43 curved and recessed rearward. The lower connector 19 of the connecting assembly 14 is removably engageable or fittable in the cavity 43 from the front.

With reference to FIGS. 6 to 9, indicated at 45 is a pair of opposite restraining assemblies. Each assembly 45 releasably prevents the lower connector 19 from being removed from the engaging cavity 43 of the lower connectable portion 42 and comprises an upright hollow cylinder 46, a retainer 47 in the form of a round rod, a biasing spring 48, restricting member 49, a locking plate 50, etc.

The upright cylinder 46 extends upward in a forwardly inclined position from the upper wall of the lower connectable portion 42. The locking plate 50 extends upward from the rear side of its upper end and has a semicircular engaging recess 51 in its upper end.

The retainer 47 is inserted through the cylinder 46 and the lower connectable portion 42 movably axially of the cylinder 46, i.e., upwardly or downwardly. The retainer 47 is shiftable to a restraining position where the retainer 47 prevents the lower connector 19 from moving out from the engaging cavity 43 of the lower connectable portion 42 as shown in FIG. 6, to a preparation position where the retainer 47 is located above the cavity when the lower connector 19 engages in the cavity 43 of the lower connectable portion 42, or to an allowing position where the retainer 47 is again located above the cavity thus allowing the lower connector 19 to be removed from the cavity 43.

When in the restraining position, the retainer 47 is inserted through the upper and lower walls and the cavity 43 of the lower connectable portion 42 and engaged in the circumferential groove 24 of the lower connector on the front side thereof as seen in FIG. 6.

As shown in FIG. 7, the preparation position and the allowing position of the retainer 47 are the same or substantially the same, such that the retainer 47, when so positioned, is held retracted upward from the engaging cavity 43 of the lower connectable portion 42 and positioned at a higher level than the restraining position.

The retainer 47 is tapered at its lower end to provide a bearing face 52 and is fixedly provided at its upper end a U-shaped upwardly projecting engaging member 53. When the engaging member 53 is oriented rearward with its lower end releasably engaged in the recess 51 of the locking plate 50 as indicated in phantom lines in FIGS. 6 and 9, the retainer 47 is locked in its allowing position.

At a lengthwise intermediate portion of the retainer 47, a spring support ring 54 and a retaining ring 55 for the ring 54 are fitted around the retainer. The biasing spring 48 is wound around the retainer 47 in bearing contact with the ring 54 and with another spring support ring 56 disposed at the upper end of the upright cylinder 46 to bias the retainer 47 downward, i.e., toward the restraining position. Indicated at 57 is a retaining ring for the support ring 56. When the retainer 47 is in the restraining position, the retaining ring 55 bears on the upper surface of the upper wall of the lower connectable portion 42.

The restricting member 49 is movably supported at its lower end by a pivot 58 projecting inward from a front lower end portion of each bracket 32.

The restricting member 49 is inserted in a cutout 59 formed in the lower connectable portion 42 and has a forwardly downwardly slanting latch face 60 at the upper end of its front side and a forwardly upwardly slanting cam face 61 extending downward from the face 60 on the front side of the member 49.

The restricting member 49 is shiftable between a holding position where the latch face 60 is in engagement with the bearing face 52 of the retainer 47 to releasably hold the retainer in the preparation position as shown in FIG. 7, and a releasing position where the retainer 47 is out of engagement with the member 49 as indicated in a solid line in FIG. 6 or in a phantom line in FIG. 7.

When brought to the holding position, the restricting member 49 extends into the cavity 43 of the lower connectable portion 42 into contact with the lower end inner face of the cutout portion 59, the inner face thus serving as a stopper 62. When in the releasing position, the restricting member 49 is in bearing contact with the grooved surface 24 of the lower connector 19 of the assembly 14, as advanced into the cavity 43 to a small extent.

The restricting member 49 is in its rearmost releasing position where it is in contact with the support arm 31 as indicated in the phantom line in FIG. 7. The restricting member 49 is so constructed that even in this phantom-line position, the center of gravity of the member 49 is positioned forwardly of a vertical line 63 through the center of the pivot 58. Consequently, the restricting member 49, in whatever releasing position, is biased toward the holding position under gravity.

With reference to FIG. 4, the PTO shaft 7 of the tractor T is separably operatively connected to the input shaft 39 of the tiller or implement C by a transmission shift 65, and a tractor joint 66T and a tiller joint 66C provided at opposite ends of the shaft 65.

The transmission shaft 65 comprises a tubular member 67 providing its front portion and a rod 68 providing its rear portion and slidably splined to the tubular member 67 and is extendable or contractable.

Figure 14:
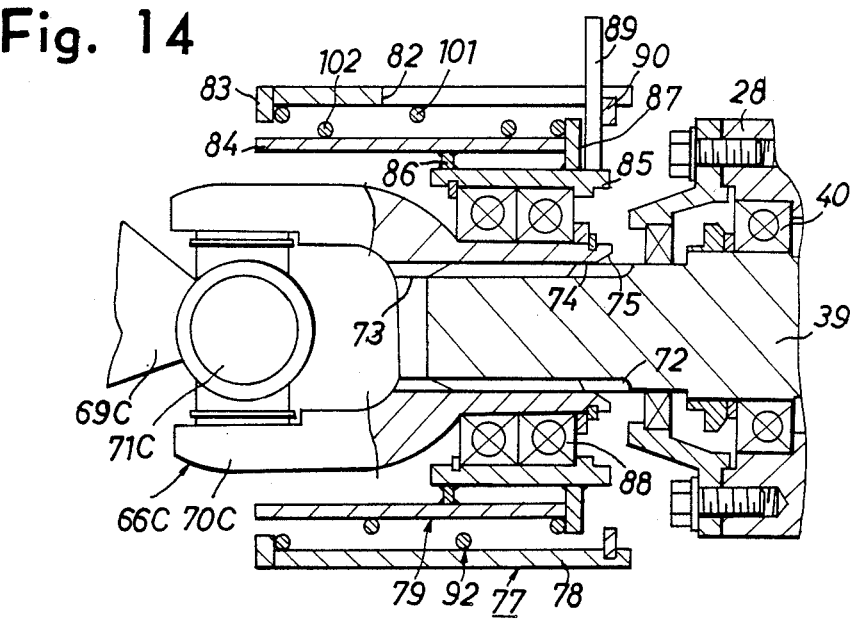
Figure 15:
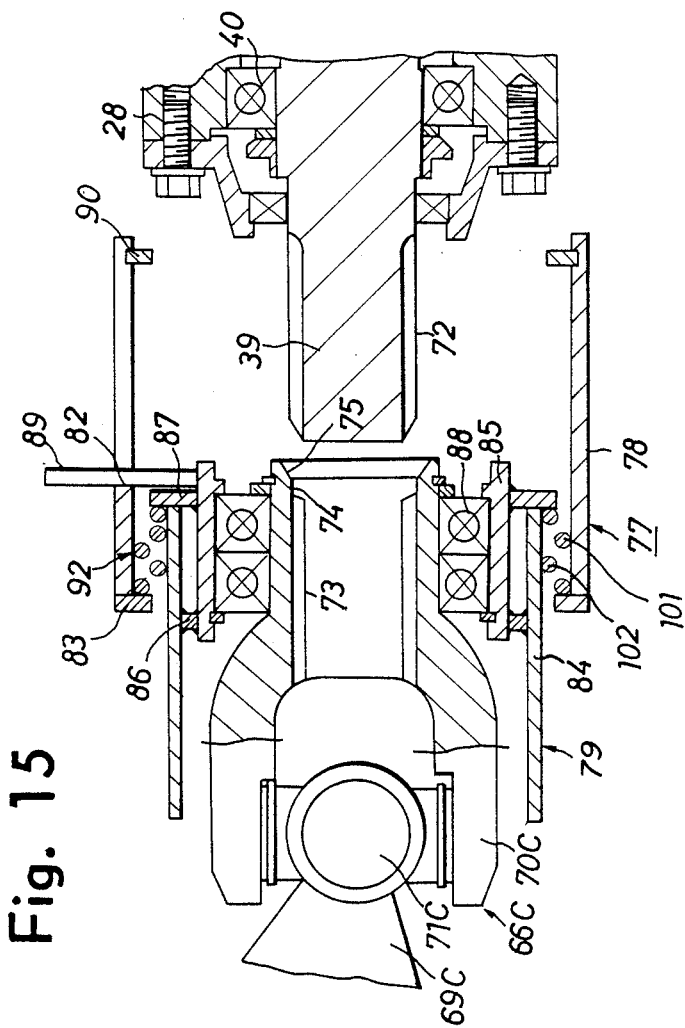

With reference also to FIGS. 14 and 15, the tractor and tiller joints 66T, 66C are each in the form of a universal joint and comprise front yokes 69T, 69C, rear yokes 70T, 70C and spiders 71T, 71C, respectively, for interconnecting front and rear yokes 69T, 69C and 70T, 70C. The tractor PTO shaft 7 has an externally splined portion removably operatively fitted in an internally splined portion of the front yoke 69T of the tractor joint 66T.

The rear yoke 70T of the tractor joint 66T and the front yoke 69C of the tiller joint 66C are attached to the corresponding ends of the tubular member 67 and the rod 68 of the transmission shaft 65, respectively, and are not rotatable relative thereto.

As seen also in FIGS. 14 and 15, the rear portion of the rear yoke 70C of the tiller joint 66C is internally formed with a splined portion 73 having removably fitted therein an externally splined portion 72 of the input shaft 39, a portion 74 smooth-surfaced and having a constant diameter axially thereof and a tapered portion 75 smooth-surfaced and tapered toward the tractor T, the portions 73, 74, 75 being arranged toward the tiller C axially of the yoke.

The rear yoke 70C of the tiller joint 66C is separably operatively connected to the input shaft 39 of the tiller C by a clutch 77 which is disposed under the widthwise midportion of the connecting assembly 14. With reference to FIGS. 10 to 15, the clutch 14 comprises a guide 78, a tubular case 79, an operating assembly 80, etc.

The guide 78, which is in the form of a hollow cylinder, extends substantially longitudinally of the tractor T and is inclined forwardly downward. The guide 78 is connected at opposite sides of its lower portion to the tubular members 18 at the lower side thereof separably by a pair of support members 81. The guide 78 is formed in opposite sides of its vertically middle portion with a pair of guide slots 82 extending forward from its rear end axially thereof. The guide 78 is fixedly provided with a spring support ring 83 projecting radially inwardly thereof.

The tubular case 79 is disposed inside the guide 78 concentrically therewith and comprises an outer sleeve 84, an inner sleeve 85 provided inside the outer sleeve 84 concentrically therewith at the rear portion thereof, and front and rear connecting pieces 86, 87 interconnecting the two sleeves 84, 85. The rear portion of the rear yoke 70C of the tiller joint 66C is supported by bearings 88 on the inner sleeve 85.

A pair of lateral rods 89 extend outward sidewise from the rear end of the inner sleeve 85 and are inserted through the guide slots 82 of the guide 78 movably longitudinally thereof and rotatably relative thereto, whereby the tubular case 79 is supported by the guide 78 movably axially thereof and rotatably about the rods 89.

The axial movement of the tubular case 79 shifts the case 79 to a connecting position where the rear yoke 70C of the tiller joint 66C within the case 79 is operatively connected to the input shaft 39 of the tiller C as seen in FIG. 14, or to a separating position where the rear yoke 70C within the case 79 is separate from the tiller C as shown in FIG. 15. When in the connecting position, the tubular case 79 is housed in the guide 78, while when in the separating position, it is greatly projected from the guide 78.

Owing to the rattling of the lateral rods 89 of the case 79 in the guide slots 82 and a clearance between the guide 78 and the case 79, the case 79 is rotatable at its rear portion about a vertical axis perpendicular to the lateral rods 89 and is translatable in any radial direction.

A stopper 90 which is, for example, a retaining ring is provided inside the guide 78 at its rear end. The contact of the lateral rods 89 with the stopper 90 restrains the tubular case 79 from moving rearward beyond a specified position relative to the guide 78.

A plurality of front connecting pieces 86 and rear connecting pieces 87 are equidistantly spaced apart circumferentially of the case 79. The rear pieces 87 project radially outward beyond the outer sleeve 84.

The contact of the rear connecting piece 87 with the inner surface of the guide 78 and of the spring support ring 83 with the outer surface of the outer sleeve 84 prevents the radial translation of the tubular case 79 beyond a specified position.

With the upper and lower connectors 17, 19 of the connecting assembly 14 attached to the upper and lower connectable portions 41, 42 of the tiller C, the operating assembly 80 axially moves the case 79 to thereby shift the case between the connecting position and the separating position. The operating assembly 80 comprises a coiled spring 92, shifters 93, holders 94, biasing springs 95, coupling means 96, a shifter interlocking member 97, a holder interlocking member 98 and an operating lever 99. The components 93, as well as the other components 94 to 96, are provided in a pair.

The coiled spring 92 is provided around the outer sleeve 84 of the tubular case 79 in bearing contact with the spring support ring 83 and the rear connecting pieces 87 for biasing the case 79 rearward, i.e., toward the tiller C. The spring 92 is not constant in diameter axially thereof but has large-diameter portions 101 and small-diameter portions 102 arranged alternately in the axial direction. The large-diameter portions 101 are in contact with the inner peripheral surface of the guide 78, and the small-diameter portions 102 with the outer peripheral surface of the outer sleeve 84. Thus, the case 79 is supported by the coiled spring 92 on the guide 78 translatably in any radial direction and rotatably about the lateral rods 89.

In addition to the large- and small-diameter portions 101, 102, the coiled spring 92 may have portions of a diameter intermediate therebeteen.

A pair of brackets 103 extend upward from upper opposite side portions of the guide 78. The shifter interlocking member 97, which is tubular, is inserted through the brackets 103 rotatably about its axis.

The shifters 93, which are operatively connected together by the interlocking member 97, are secured to the respective ends of the member 97, pivotally movable as supported by the member 97 and positioned outside the guide 78. The shifters 93 shift the tubular case 79 between the connecting position and the separating position through the lateral rods 89. Each shifter 93 has at its lower portion downwardly projecting front and rear operating portions 104, 105 positioned in front and rear of the rod 89, respectively.

Each holder 94 is disposed inwardly of the shifter 93 and movably supported by a lateral pivot 106 on the guide 78. The holder 94 has front and rear recessed latch portions 107, 108 which are engageable with the lateral rod 89 to releasably hold the case 79 in the separating position and the connecting position.

The holder interlocking member 98 is formed by bending a rod into a U-shape, fitted around the front portion of the guide 78 and has its ends secured to the front ends of the holders 94 to operatively connect the holders 94 together.

Each biasing spring 95 is provided between and attached to the rear end of the holder 94 and the support member 81 under tension for biasing the holder 94 downward, i.e., in a direction to latch the lateral rod 89.

Each coupling means 96 operatively connects the shifter 93 to the holder 94 at each side of the guide 78 to cause the operating portion 104 or 105 of the shifter 93 to move the lateral rod 89 after the rod 89 has been released from the holder 94. The coupling means 96 comprises a cam slot 109 formed in a lower portion of the shifter 93 and mound-shaped when seen from one side and a cam pin 110 projecting outward sidewise from a longitudinally intermediate portion of the holder 94 and movably inserted in the cam slot 109.

The operating lever 99 extends upward from a side portion of the shifter interlocking member 97 for operating the shifters 93 and the holders 94.

Figure 11:
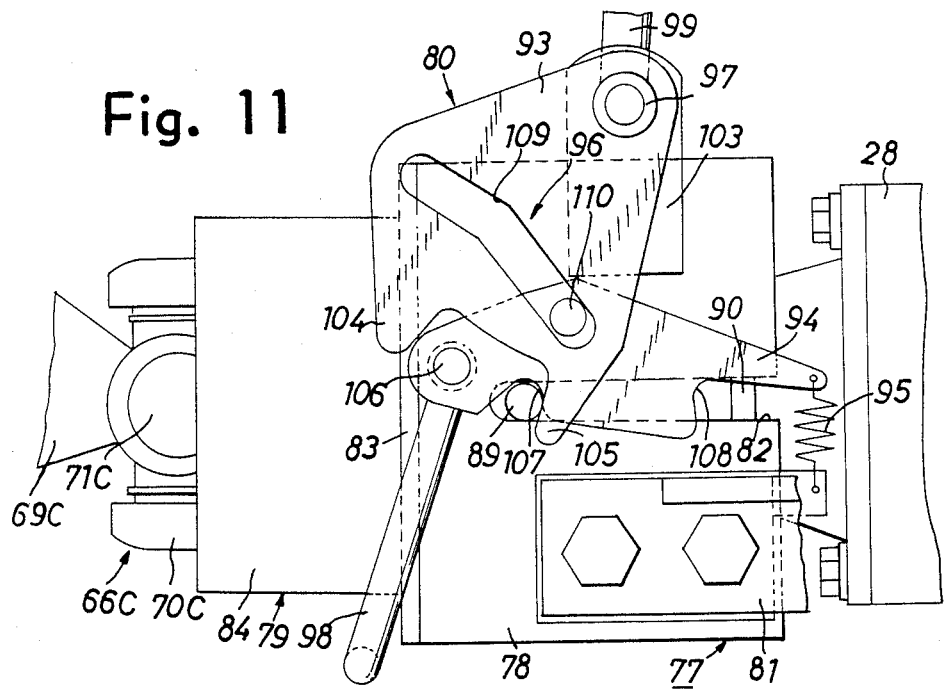

When the tiller C is to be connected to the tractor T by the embodiment of the above construction, the tubular case 79 of the clutch 77 is held in the separating position as seen in FIGS. 11 and 15.

In the above state, the tubular case 79 is greatly projected forward from the guide 78, with each lateral rod 89 at the front end of the guide slot 82. Each shifter 93 is in a forwardly rotated position, with its rear operating portion 105 in contact with the lateral rod 89 or slightly rearwardly away therefrom.

On the other hand, the tiller C is placed on the ground in a slightly forwardly inclined position as seen in FIG. 2. With the tiller C, the retainer 47 of each restraining assembly 45 is held in its raised preparation position by the restricting member 49 in its holding position with the engaging member 53 oriented rearward as seen in FIG. 7.

In the above case, the center of gravity of the restricting member 49 is so positioned that when in its releasing position, the member 49 is biased toward the holding position by gravity, while the restricting member 49 is maintained in the holding position by the stopper 62. Accordingly, when it is to be set in the preparation position, the retainer 47 needs only to be pulled up to this position, whereupon the restricting member 49 automatically shifts from the releasing position to the holding position. When the retainer 47 is then released from the hand, the retainer 47 can be held in the preparation position by the restricting member 49. Thus, the retainer 47 is readily settable in the preparation position.

The tractor T is subsequently advanced rearward toward the tiller C to position the cutout 22 of the upper connector 17 of the connecting assembly 14 and the lower connectors 19 thereof below the upper connectable portion C of the tiller C and the engaging cavities 43 of the lower connectable portions 42 thereof, respectively as seen in FIG. 2.

Next, the three-point link assembly 9, the connecting assembly 14 and the clutch 77 are gradually raised by the hydraulic unit 5, engaging the upper connectable portion 41 in the cutout 22 of the upper connector 17. In this state, the lower connectors 19 are positioned in front of the lower connectable portions 42.

When the assemblies 9, 14 and the clutch 77 are further raised, the tiller C is pivotally moved about the upper connector 17 toward the tractor T, i.e. forward, since the upper connectable portion 41 is engaged in the cutout 22 of the upper connector 17.

Consequently, each lower connector 19 fittingly engages in the cavity 43 of the lower connectable portion from forward relative thereto as seen in FIG. 7, coming into contact with the cam face 61 of the restricting member 49. The lower connector 19 is brought to the specified rear position within the cavity 43 while pivotally moving the restricting member 49 rearward as seen in FIG. 6.

The rearward movement of the restricting member 49 brings the member 49 to the releasing position, freeing the retainer 47 and permitting the retainer 47 to move downward under the action of the spring 48 to the restraining position, where the retainer 47 engages in the circumferential groove 24 of the lower connector 19 at the front side thereof as seen in FIG. 6, preventing the lower connector 19 from moving out of the cavity 43.

In the above procedure, it is likely that the lower connectors 19 will be out of their normal path of movement, but each lower connectable portion 42 will then slide on the outer side surface of the side guide member 23 relative thereto, whereby each lower connector 19 is brought into the normal path for correction.

The tiller C, when to be attached to the connecting assembly 14, is pivotally moved toward the tractor T about the upper connector 17, whereby the tiller input shaft 39 is brought into the guide 78 of the clutch 77 and opposed to the rear yoke 70C of the tiller joint 66C with a small clearance formed therebetween as shown in FIGS. 11 and 15.

The front end of the input shaft 39 may be fitted into the tapered portion 75 or the constant-diameter portion 74 of the rear yoke 70C The rear yoke 70C of the tiller joint 66C in the above state is joined to the input shaft 39 by the operator on the seat 2, who stretches his hand rearward and turns the operating lever 99 of the clutch 77 forward.

Figure 12:
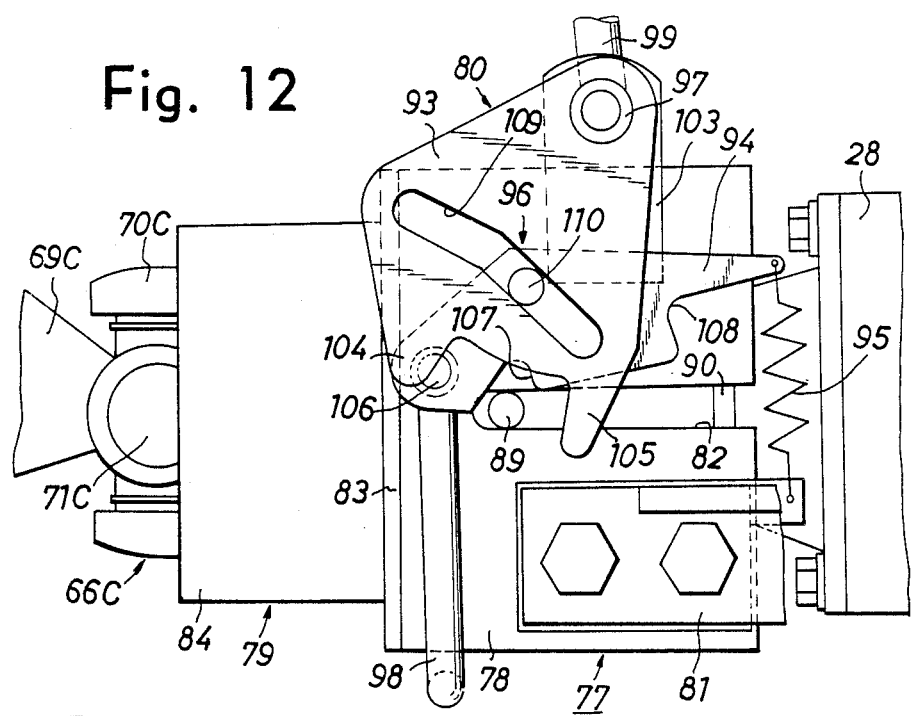
Figure 13:
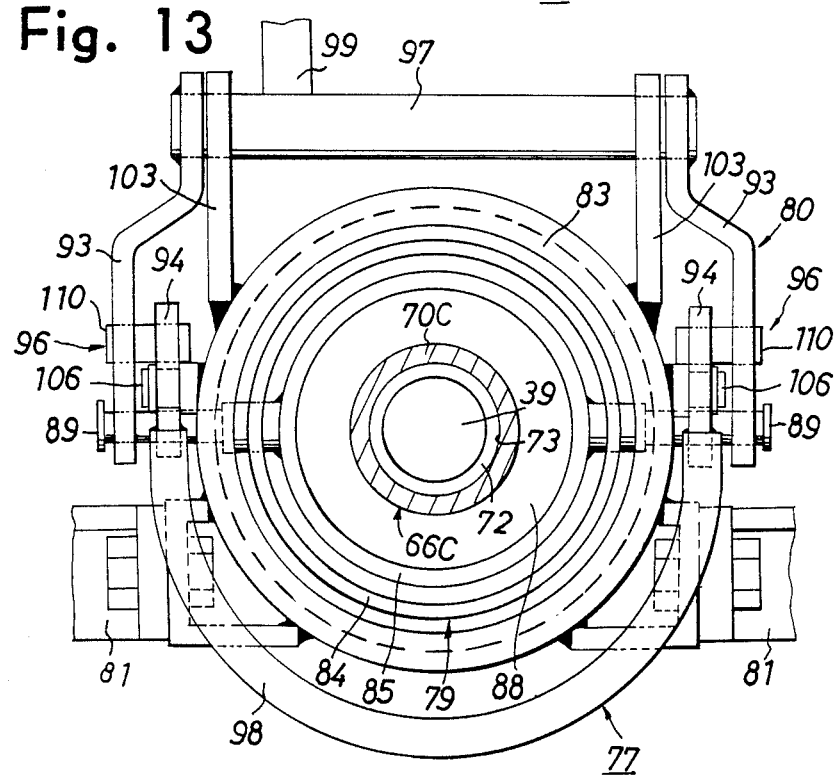

This causes the shifter interlocking member 97 to pivotally move the pair of shifters 93 rearward, permitting the cam pins 110 on the holders 94 to forwardly move through the cam slots 109 in the shifters 93 relative thereto, whereby each holder 94 is raised against the biasing spring 95 to release the lateral rod 89 from the front latch portion 107 downward relative thereto as seen in FIG. 12 The rod 89 is now positioned approximately in the midportion between the front and rear operating portions 104, 105 of each shifter 93.

Figure 10:
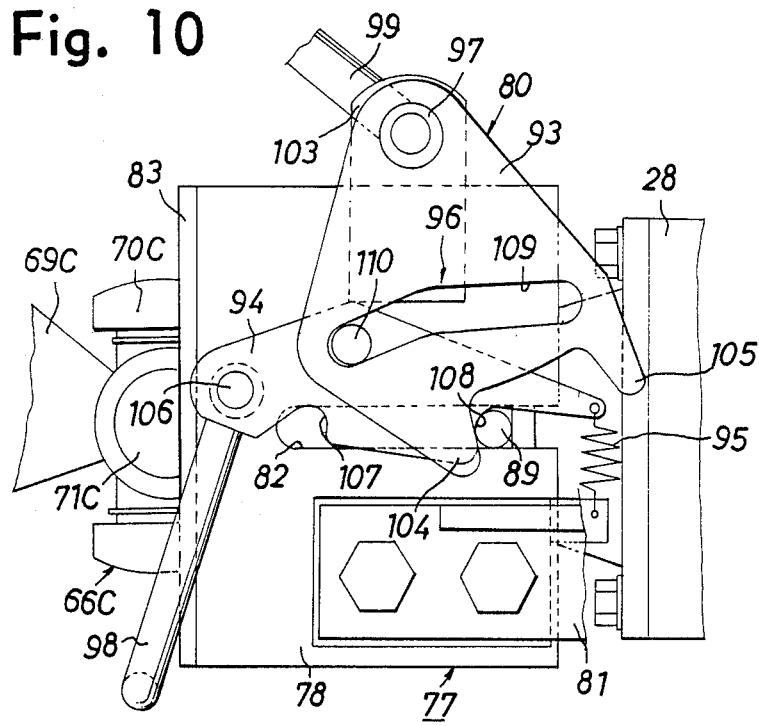

Upon the release of the lateral rods 89 from the front latch portions 107 of the holders 94, the tubular case 79, which is biased rearward by the coiled spring 92, moves rearward along with the rods 89 and the rear yoke 70C of the tiller joint 66C while extending the transmission shaft 65 and fits around the input shaft 39, with the internally splined portion 73 of the rear yoke 70C fitted around the externally splined portion 72 of the input shaft 39 as seen in FIGS. 10 and 14.

After each lateral rod 89 has been released from the front latch portion 107 of the holder 94, the operating lever 99 is further turned forward, pivotally moving the shifter 93 rearward to the position shown in FIG. 10, whereby the front operating portion 104 is brought into contact with the rod 89 of the case 79 in the connecting position or to a position a small distance forwardly away therefrom.

Further the movement of the shifter 93 forwardly moves the cam pin 110 on the holder 94 through the cam slot 109 relative thereto. Consequently, the holder 94 moves down after rising as stated above, causing its rear latch portion 108 to engage the lateral rod 89 on the tubular case 79 in the connecting position, whereby the rear yoke 79 of the tiller joint 66C is held joined to the input shaft 39 by the case 79 thus retained in the connecting position.

As a result, the tiler joint rear yoke 70C as operatively connected to the input shaft 39 will not be inadvertently separated therefrom even when the tiller C is subjected to a great reaction from the ground.

In the above case, it appears likely that the tubular case 79 will not be moved rearward by the force of the coiled spring 92, for example, owing to the soil or the like clogging space between the guide 78 and the tube 79 of the clutch 77. Even in such an event, however, the front operating portions 104 of the rearwardly moved shifters 93 cause the lateral rods 89 to move the case 79 rearward to the connecting position readily.

In the above procedure, the input shaft 39 does not advance into the tubular case 79 axially thereof, but the forward pivotal movement of the tiller C about the upper connector 17 brings the nput shaft 39 into the guide 78 to a position opposed to and at a small distance from the rear end of the tiller joint rear yoke 70C. Accordingly, even if the input shaft 39 and the rear yoke 70C are properly positioned relative to each other before connection, the axes thereof intersect.

When the rear yoke 70C of the tiller joint 66C is to be fitted to the input shaft 39, therefore, the rear end of the internally splined portion 73 of the rear yoke 70C must be moved upward almost without shifting to alter the inclination of the axis of the splined portion 73 and thereby align the axis with the axis of the externally splined portion 72 of the input shaft 39.

The tubular case 79 supporting the rear yoke 70C is supported by the guide 78 movably about the lateral rods 89 which are parallel to the axis of pivotal movement of the tiller C, and the rods 89 are positioned at the rear end of the splined portion 73, with the result that the movement of the rear yoke 70C with the case 79 about the lateral rods 89 alters the inclination of the axis of the splined portion 73 almost without shifting the rear end. This readily aligns the splined portion 73 with the splined portion 72 of the input shaft 39, assuring smooth and proper fitting of the two splined portions 72 and 73.

Furthermore, the case 79 and the rear yoke 70C therein are movable relative to the guide 78 about a vertical axis perpendicular to the axis of the lateral rods 89 and are translatable in any radial direction. When the rear yoke 70C and the input shaft 39 to be joined together are in the proper position or not properly positioned relative to each other, the rear yoke 70C and the case 79 will move about the rods 89 or the above-mentioned vertical axis or will be translated radially thereof when the yoke 70C is to be joined to the input shaft 39, whereby the yoke 70C and the input shaft 39 can be readily aligned to assure easy and smooth fitting of the yoke 70C to the input shaft 39.

In this way, the tiller C is completely connected to the tractor T.

The tiller C is disconnected from the tractor T by a procedure reverse to the above. First, the operating lever 99 of the clutch 77 is turned rearward.

This moves each shifter 93 forward, permitting the cam pin 110 on each holder 94 to move through the cam slot 109 rearward relative to the shifter and raising the holder 94 first to release the rod 89 from the rear latch portion 108 downward relative to the holder, whereby the case 79 held by the holder 94 in the connecting position is freed therefrom.

Further rearward turn of the operating lever 99 brings the rear operating portion 105 of each shifter 93 into contact with the lateral rod 89, causing the rod 89 to shift the case 79 to the separating position against the coiled spring 92 while contracting the transmission shaft 65, whereby the rear yoke 70C of the tiller joint 66C is removed forward from the input shaft 39.

At the same time, the cam pin 110 moves through the cam slot 109 to its rear end, lowering the holder 94 and allowing the rod 89 to engage with the front latch portion 107 thereof from below relative to the holder. Consequently, the case 79 is held in the separating position.

The rear yoke 70C of the tiller joint 66C is connectable to and separable from the input shaft 39 by the clutch 77 easily moving the shifters 93 and the holders 94 with the single operating lever 99.

Consequently, not only the three-point link assembly of the tractor T is readily connectable to and separable from the tiller C, but the tiller joint 66C operatively connected to the tractor PTO shaft 7 can also be connected to or separated from the tiller input shaft 39 with ease quickly, with the result that the overall work for connecting the tiller C to the tractor T or separating the tiller from the tractor can be carried out with greater ease within a shorter period of time.

The pair of shifters 93 are operatively connected together by the interlocking member 97, and the pair of holders 94 by like member 98, so that the opposite shifters 93, as well as the opposite holders 94, can be operated satisfactorily at the same time. This ensures proper operation, obviating the likelihood of distorting the tubular case 79, etc.

Moreover, the rear yoke 70C of the tiller joint 66C serves as a connecting rod for direct connection to the input shaft 39, while the extension or contraction of the transmission shaft 65 permits the shift of the rear yoke 70C for connection to the input shaft 39 or separation therefrom. This eliminates the need to additionally provide an extendable portion for the clutch 77 to permit the above shift, rendering the clutch 77 compact and obviating the likelihood that the distance between the tractor T and the tiller C becomes longer than is the case with conventional devices.

Subsequently, the retainer 47 of the restraining assembly 45 is pulled up and locked in the allowing position by engaging the member 53 in the recess 51 of the locking plate 50.

The tiller C is then lowered to place the tilling assembly 35 on the ground by the hydraulic unit 5 through the three-point link assembly 9 and the connecting assembly 14.

When the assemblies 9 and 14 are further lowered, the tiller C is inclined forward, whereby the lower connectors 42 of the assembly 14 are first removed from the cavities 43 of the lower connectable portions 42, and the upper connectable portion 41 is then removed from the upper connector 17 of the assembly 14 upward relative thereto.

At the same time, the input shaft 39 is removed from the tubular case 79 of the clutch 77 rearward relative thereto. Thus, the tiller C is completely separated from the tractor T.

According to the invention, the connecting assembly 14, the lower connectable portions 42 of the tiller C and the restraining assembly 45 may be so constructed as shown in FIGS. 16 to 19.

The connecting assembly 14 comprises lower connectors 19 which are formed with no circumferential groove and each have a side guide member 23 fixedly fitted therearound approximately at the axial midportion thereof.

A plate 112 opposed to the inner side of the bracket 32 extends forward from each of the opposite support arms 31 of the tiller C. The lower connectable portion 42 comprises bracket 32 and opposed plate 112, which are formed at their front portions with an engaging cavity 43 curved and recessed rearward.

Figure 16:
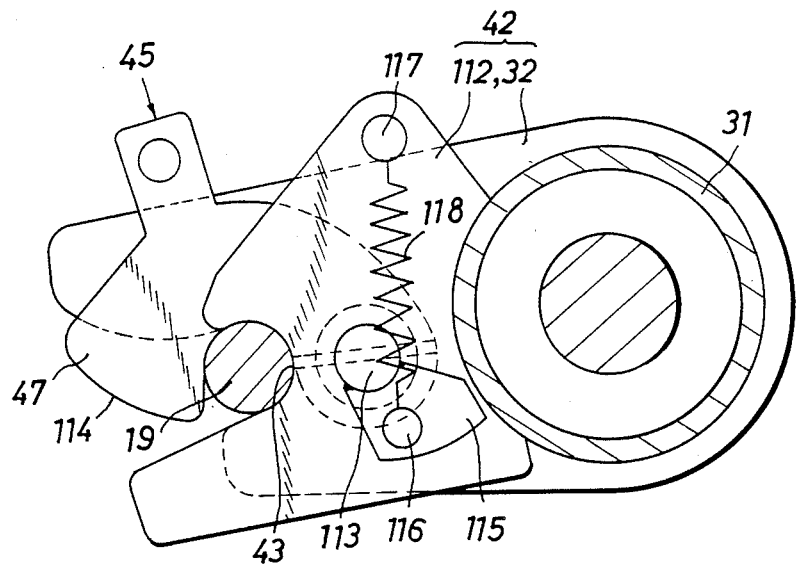
FIGS. 16 to 19 show another embodiment of the invention.

The restraining assembly 45 includes a hooked retainer 47 in the form of a flat plate. The retainer 47 is interposed between the bracket 32 and the opposed plate 112 and movably supported by a lateral pivot 113 thereon. When pivotally moved, the retainer 47 is shiftable to a restraining position where the retainer engages the lower connector 19 from above releasably as shown in FIG. 16, to a preparation position shown in FIG. 17 or to an allowing position shown in FIG. 18. The retainer 47 is shifted from the restraining position to the preparation when pivotably moved downward, or to the allowing position when pivotally moved upward.

Figure 17:
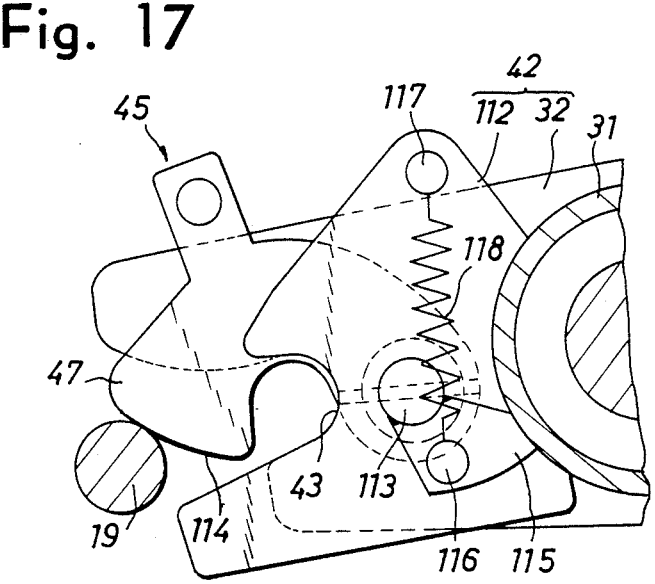
Figure 18:
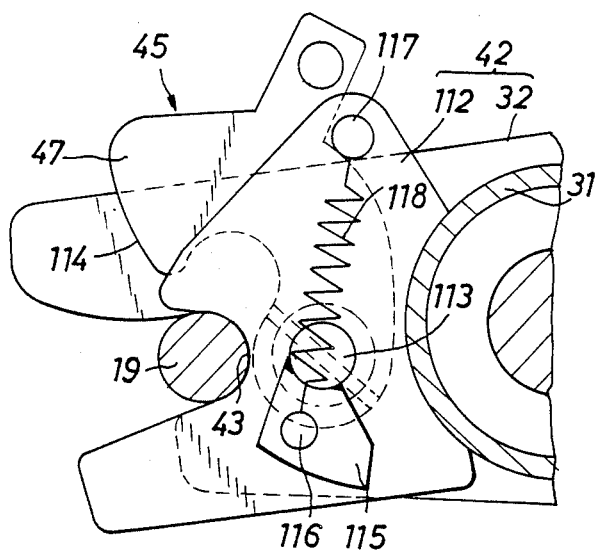
Figure 19:
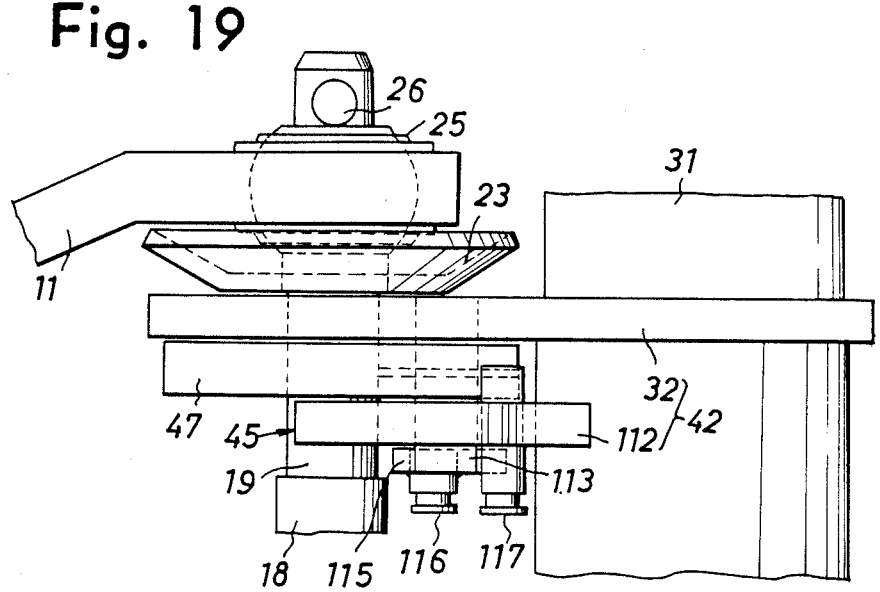

The retainer 47 has at its front lower portion a curved cam face 114 inclined forwardly upward. When the retainer 47 is in the preparation position, the lower connector 19 of the connecting assembly 14 advances toward the lower connectable portion 42 of the tiller C into contact with the cam face 114 of the retainer 47 as seen in FIG. 17, whereby the retainer 47 is pivotally moved upward beyond the restraining position, allowing the lower connector 19 to engage in the cavity 43 of the lower connectable portion 42.

A coupled lever 115 extends downward from the inner end of the pivot 113 and is positioned inwardly of the opposed plate 112. A tensioned change spring 118 is attached to a pin 116 projecting inward from the lever 115 and to a pin 117 projecting from the upper end of the opposed plate 112 both inward and outward for unstably changing over the position of the retainer 47 between the preparation position and the allowing position.

The contact of the lever 115 with the support arm 31 prevents the retainer 47 from moving further downward, while the retainer 47 is prevented from moving beyond the allowing position by bearing against the pin 117.

Further according to the invention, the coupling means 96 of the operating assembly 80 of the tubular case 7 may have the following construction.

Figure 20:
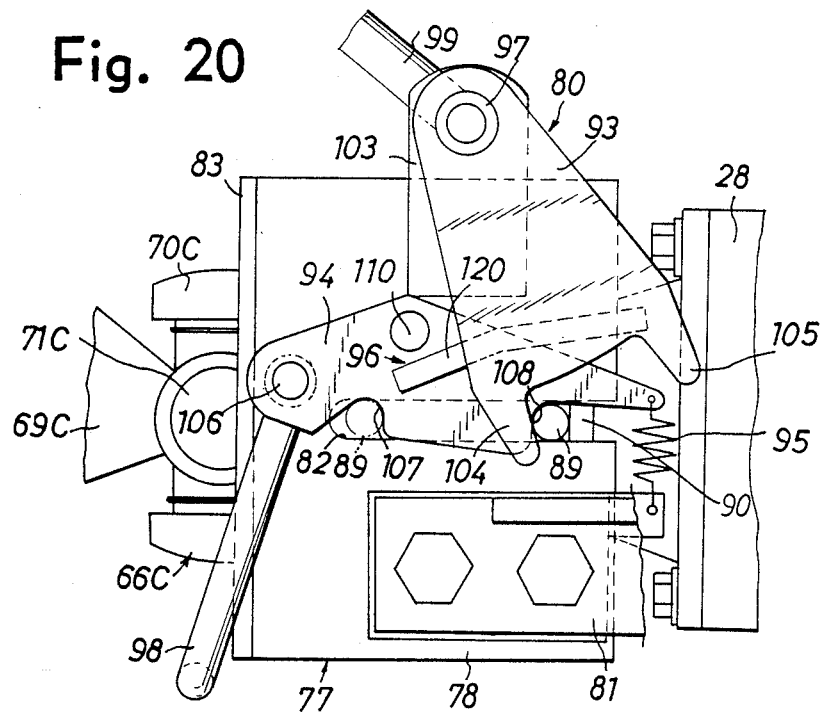
FIGS. 20 and 21 show another embodiment of the invention.
Figure 21:
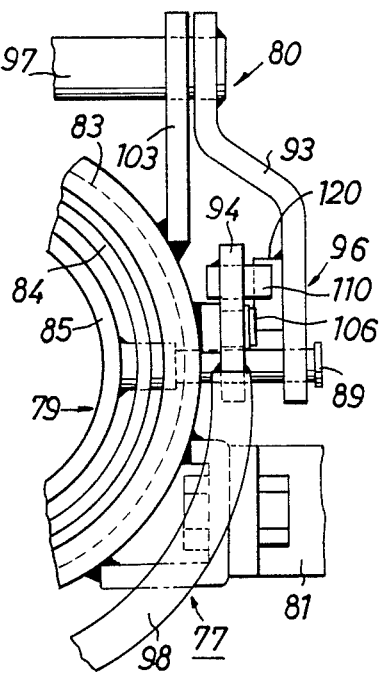

FIGS. 20 and 21 show coupling means 96 wherein instead of the foregoing cam slot, a projecting cam plate 120, mound-shaped when seen from one side, is secured to the inner side of the shifter 93. The cam pin 110 is guided by the upper face of the cam plate 120.

Further according to the invention, the assembly 80 for operating the tubular case 79 can be of the following construction.

Figure 22:
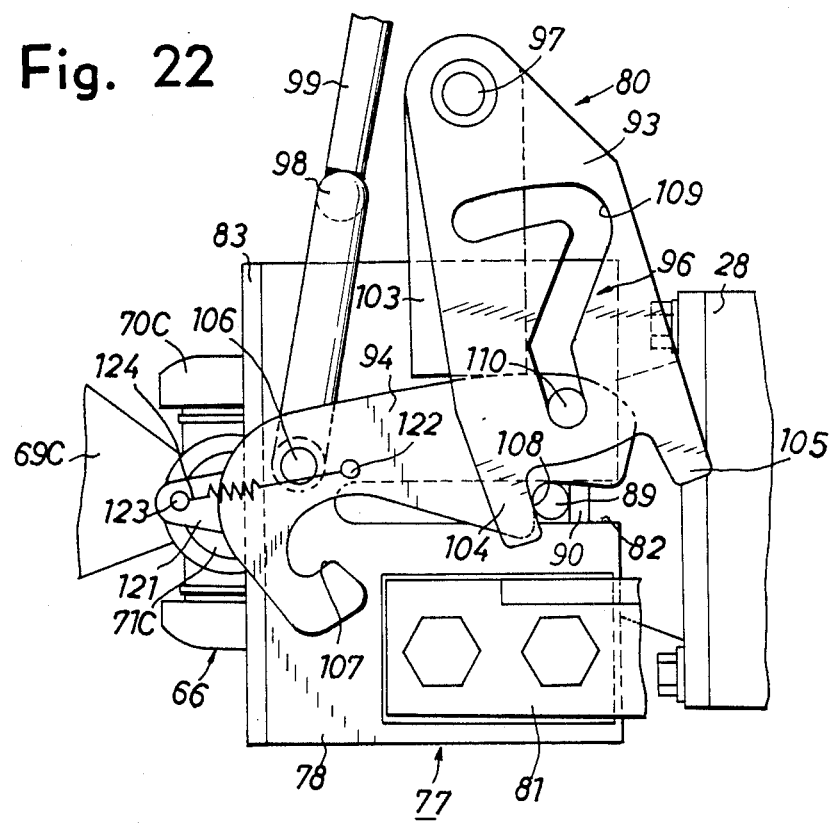
FIGS. 22 and 23 show another embodiment of the invention and are side elevations chiefly showing a clutch in different operative positions.
Figure 23:
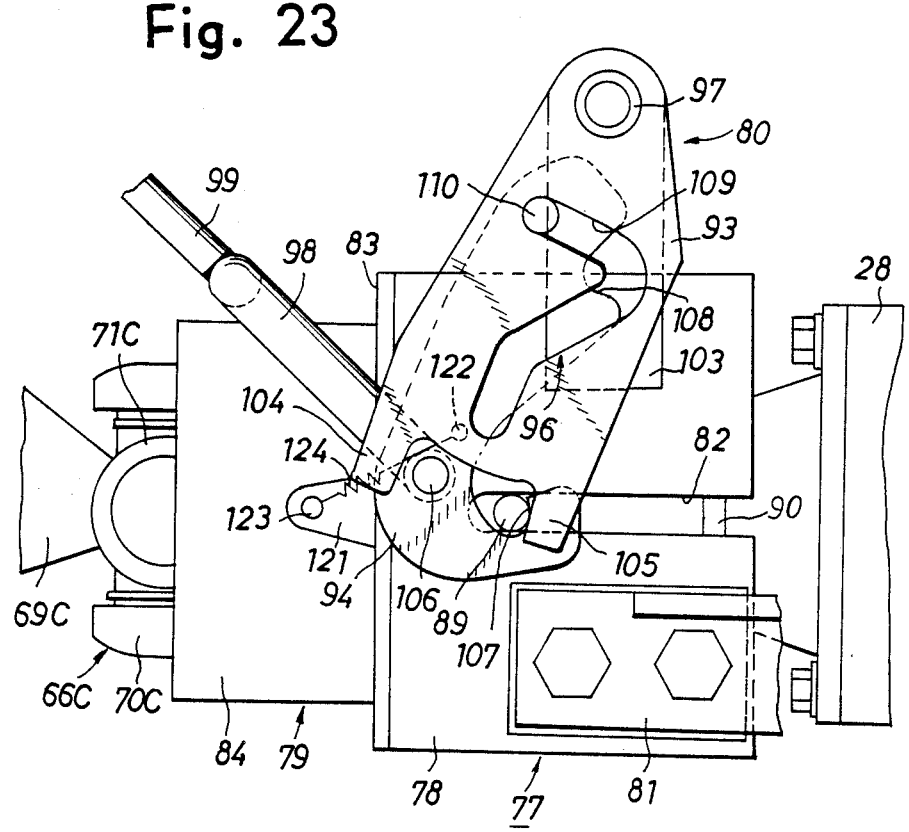

FIGS. 22 and 23 show a holder interlocking member 98 which is fitted around the guide 78 from above and which is provided with an operating lever 99.

The spring support ring 83 has a pair of opposed brackets 121 projecting forward from its opposite side portions. A change spring 124 extends between and is attached to pins 122, 123 projecting outward sidewise from each holder 94 and each bracket 121, respectively, for unstably changing over the position of the holder 94 between a rotated position where the rear latch portion 108 thereof latches the lateral rod 89 as shown in FIG. 22 and another rotated position where the front latch portion 107 latches the rod 89 as shown in FIG. 23.

With this arrangement, the coupling means 96 for the operating assembly 80 comprises a cam slot 109 and a cam pin 110.

Figure 24:
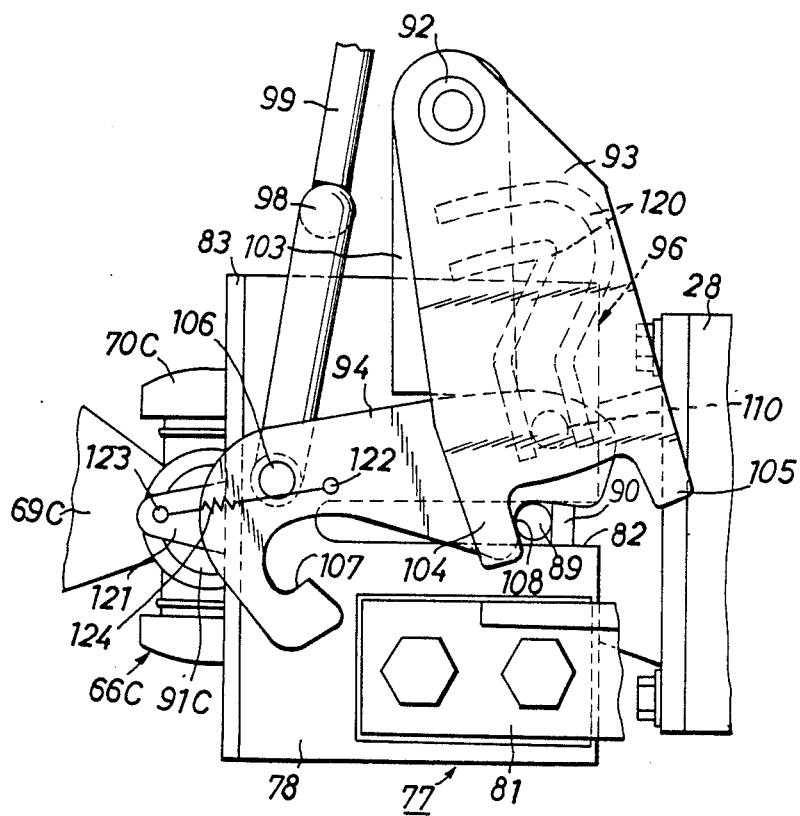
FIG. 24 is a side elevation of another embodiment of the invention showing a clutch, etc.

The coupling means 96 shown in FIGS. 22 and 23 may be so constructed as shown in FIG. 24.

The shifter 93 shown in FIG. 24 is provided on its inner side with a pair of opposed cam plates 120 instead of the cam groove, and a cam pin 110 is guided between the two cam plates 120.

The universal joints used for connecting the PTO shaft to the input shaft in the foregoing embodiments may be other joints.

Although a rotary tiller is used as the working implement in the foregoing embodiments, other working implements are usable.

Furthermore, the present invention can be embodied as a device for connecting a working implement to the front of the tractor.

What is claimed is:

1. A device for disconnectably connecting a tractor (T) with a working implement (C);
   said tractor (T) being equipped with a PTO shaft, a three-point link assembly which is comprised of a central top link and a pair of opposite-sided lower links, and a lifting unit for positioning the three-point link assembly; said working implement (C) being equipped with a power input shaft which has an external splined portion, and with a connectable arrangement comprising an upper connectable portion, and a pair of lower side connectable portions; said device for disconnectably connecting comprising:
   a connecting assembly joining the top link and the two lower links,
   a transmission shaft retractably connected to the PTO shaft, a joint having an internally splinted portion being provided at an end of the transmission shaft such that the internally splined portion is to couple with the externally splined portion of the implement (C);
   said connecting assembly including an upper connector to be coupled to the upper connectable portion of the implement (C), a pair of side lower connectors to be coupled to the lower said connectable portions, and a clutch to removably connect the joint with the power input shaft of the implement (C),
   said clutch including a guide having a cylindrical form which is connected to the connecting assembly, and a tubular case which is inserted into the guide to hold the joint pivotably, a coil spring positioned between the guide and the tubular case, to retain the tubular case to be axially and radially movable in relation to the guide, and the operating assembly to move the tubular case axially in relation to the guide,
   said operating assembly including shifter means which is pivotably supported on the guide to shift by a pivotal action the tubular case axially such that the internally splined portion of the joint and the externally splined portion of the input shaft are selectively coupled;
   a holder which is pivotably held by the guide to hold by a pivotal action the tubular case at a coupled position and a decoupled position;
   coupling means for operatively connecting the shifter means and the holder; and an operating level means for operating pivotal actions of the shifter means and holder.

2. A device as defined in claim 1 wherein the joint is a universal joint comprising a pair of front and rear yokes and a spider interconnecting the yokes, and one of the yokes of the joint is inserted in the tubular case.

3. A device as defined in claim 2 wherein the yoke in the tubular casing is internally provided with said internally splined portion, a portion smooth-surfaced and constant in diameter axially thereof and a portion smooth-surfaced and tapered axially thereof toward the tractor.

4. A device as defined in claim 1 wherein the coil spring has large-diameter portions in contact with an inner peripheral surface of the guide and small-diameter portions in contact with an outer peripheral surface of the tubular case arranged alternately axially thereof, said small-diameter portions being disposed to bias the tubular case axially and toward the implement (C).

5. A device as defined in claim 4 wherein the guide has a pair of axial guide slots in opposite sides, and the tubular case has a pair of lateral rods projecting laterally outward from opposite sides of the tubular case and inserted in the respective guide slots.

6. A device as defined in claim 5 wherein the shifter means, the holder and the coupling means are provided at each of opposite sides of the guide, the opposite shifter means and the opposite holders being rotatably supported by respective lateral pivots, the tubular case being movable by the shifter means through the pair of lateral rods, the shifter means being operatively interconnected by a shifter interlocking member, the holders being arranged inwardly of the shifter means, each of the holders being provided with a pair of latch portions for releasably latching the lateral rods to hold the tubular case in the coupled position and the decoupled position respectively, the holders being operatively interconnected by a holder interlocking member.

7. A device as defined in claim 6 wherein a biasing spring is provided between each holder and each side of the guide for biasing the holder in a direction to latch the lateral rod.

8. A device as defined in claim 6 wherein each holder is shiftable to a rotated position where one of the latch portions thereof latches the lateral rod and to another rotated position where the other latch portion thereof latches the lateral rod, a change spring being provided between the holder and the guide for unstably changing over the position of the holder between the rotated positions.

9. A device as defined in claim 6 wherein the coupling means comprises a cam slot formed in the shifter means and mound-shaped when seen from one side and a cam pin projecting outward sidewise from each of the holders and inserted in the cam slot.

10. A device as defined in claim 6 wherein an coupling means comprises a cam plate secured to the inner side of the shifter means and mound-shaped when seen from one side and a cam pin projecting outward sidewise from each of the holders and guidable by an upper face of the cam plate.

11. A device as defined in claim 6 wherein the coupling means comprises a pair of opposed cam plates secured to an inner side of the shifter means and a cam pin projecting outward sidewise from each of the holders and guidable between the cam plates.

12. A device as defined in claim 6 wherein the operating lever means is attached to the shifter interlocking member.

13. A device as defined in claim 6 wherein the operating level means is attached to the holder interlocking member.

14. A device as defined in claim 1, wherein:
said upper connector has a cutout which forms an upwardly open recess, each of said side lower connectors is a round bar projecting laterally, said upper connectable portion is a round bar projecting laterally, and each of said side lower connectable portions has an engaging cavity to the tractor (T);
wherein the upper and side lower connectors of the tractor (T) and the upper and side lower connectable portions of the implement (C) are disposed to act, when the tractor (T) and the implement (C) are being connected, such that the cutout of the upper connector receives first the round bar of the upper connectable portion due to a rise of the connecting assembly by the lifting unit, and then, due to continuing rise of the connecting assembly, the implement (C) is pivoted about the upper connector of the tractor (T) nearing with the engaging cavities of the side lower connectable thereof to attain engagements of the side lower connectable portions;
and each of the lower connectable portions of the implement (C) comprising a restraining means which selectively closes the cavity to prevent the round bar of the lower connector from leaving the cavity.

15. A device in claim 14, wherein said restraining means comprises:
an upright hollow cylinder standing on the lower connectable portion;
an axially movable retainer in the upright cylinder which has a round bottom end and is to block the opening of the cavity in response to axial movement;
a restricting member which is supported on a pivotal shaft adjacent the lower connectable portion and is to optionally engage the bottom end of the retainer to prevent downward movement thereof,
a locking plate is attached on the upright cylinder and is to hold the retainer at an up position,
wherein, when the retainer is not held by the locking plate and has its bottom end engaged on the restricting member, each of the lower connectors of the tractor (T) is allowed to enter into each said cavity to make the engagement, wherein entering of each of the lower connectors pushes the restricting member to disengage the retainer from the restricting member, whereupon the retainer is moved down to close the opening of each said cavity, thereby locking each of the lower connectors in position.

16. A device as defined in claim 14, wherein:
the restraining means comprises a retainer which is pivotable around a lateral shaft of the lower connectable portion of the implement (C), and a tensioned spring which is to urge the retainer around the lateral shaft,
said retainer being shaped to engage one of said lower connectors, when coupling of one of the lower connectors with one of the cavities takes place, so that one of the lower connectors is confined in one of the cavities, the retainer further having an end face configured with a curve cam profile, so that when one of the lower connectors enters into one of the cavities, one of the lower connectors pushes the came profile to turn the retainer around the lateral shaft such that coupling of one of the lower connectors with one of the cavities takes place.

17. A device for disconnectably connecting a tractor (T) with a working implement (C);
said tractor (T) being equipped with a PTO shaft, a three-point link assembly which is comprised of a central top link and a pair of opposite-sided lower links, and a lifting unit for positioning the three-point link assembly; said working implement (C) being equipped with a power input shaft which as an external splined portion, and with a connectable arrangement comprising an upper connectable portion, and a pair of lower side connectable portions;
said device for disconnectably connecting comprising:
a connecting assembly joining the top link and the two lower links,
a transmission shaft retractably connected to the PTO shaft, a joint having an internally splined portion being provided at an end of the transmission shaft such that the internally splined portion is to couple with the externally splined portion of the implement (C);
said connecting assembly including an upper connector to be coupled to the upper connectable portion of the implement (C), a pair of side lower connectors to be coupled to the lower side connectable portions, and a clutch to removably connect the joint with the power input shaft of the implement (C);

said clutch including a guide which is connected to the connecting assembly, and a tubular case which is mounted on the guide to be axially displaceable by an operating assembly, said tubular case holding the joint pivotably;

said operating assembly including shifter means which is pivotably supported on the guide to shift by a pivotal action the tubular case axially such that the internally splined portion of the joint and the externally splined portion of the input shaft are selectively coupled;

a holder which is pivotably held by the guide to hold by a pivotal action the tubular case at a coupled position and a decoupled position;

coupling means for operatively connecting the shifter means and the holder; an operating level means for operating pivotal actions of the shifter means and holder; and wherein the clutch is disposed under the connecting assembly.

* * * * *